United States Patent
Basapur et al.

(10) Patent No.: US 10,198,444 B2
(45) Date of Patent: *Feb. 5, 2019

(54) DISPLAY OF PRESENTATION ELEMENTS

(75) Inventors: Santosh S. Basapur, Hanover Park, IL (US); Shirley A. Chaysinh, Grayslake, IL (US); Young S. Lee, Palatine, IL (US); Hiren M. Mandalia, Schaumburg, IL (US); Ashley B. Novak, Chicago, IL (US); Narayanan Venkitaraman, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 1126 days.

This patent is subject to a terminal disclaimer.

(21) Appl. No.: 13/457,524

(22) Filed: Apr. 27, 2012

(65) Prior Publication Data

US 2013/0290892 A1    Oct. 31, 2013

(51) Int. Cl.
*G06F 17/30* (2006.01)
*G11B 27/34* (2006.01)
(Continued)

(52) U.S. Cl.
CPC ... *G06F 17/30064* (2013.01); *H04N 21/4316* (2013.01); *H04N 21/478* (2013.01);
(Continued)

(58) Field of Classification Search
USPC ........................................ 715/772, 720, 863
See application file for complete search history.

(56) References Cited

U.S. PATENT DOCUMENTS

| 5,874,965 A | 2/1999 | Takai et al. |
| 6,404,978 B1 | 6/2002 | Abe |

(Continued)

FOREIGN PATENT DOCUMENTS

| CN | 101345852 A | 1/2009 |
| CN | 101510995 A | 8/2009 |

(Continued)

OTHER PUBLICATIONS

Barnes C. et al.: "Video Tapestries with Continuous Temporal Zoom", In ACM Transactions on Graphics (Proc. SIGGRAPH). 29(3), Aug. 2010, all pages.

(Continued)

*Primary Examiner* — Toan H Vu
(74) *Attorney, Agent, or Firm* — Stewart M. Wiener

(57) ABSTRACT

Disclosed are methods and apparatus for displaying a plurality of presentation elements to a user. A progress bar is displayed. A length of the progress bar is representative of a duration of a multimedia presentation. A communication box is also displayed. The communication box comprises a marker and a communication composed by an originator in relation to a certain point or time period within the multimedia presentation. The progress bar and the communication box are displayed such that the marker is in alignment with a position along the length of the progress bar that corresponds to the point or time period in the multimedia presentation in relation to which the communication was composed. The marker may be moved relative to the progress bar.

14 Claims, 10 Drawing Sheets

(51) Int. Cl.
  *H04N 21/431* (2011.01)
  *H04N 21/478* (2011.01)
  *H04N 21/488* (2011.01)
  *H04N 21/854* (2011.01)
  *H04N 21/4722* (2011.01)

(52) U.S. Cl.
  CPC ..... *H04N 21/4722* (2013.01); *H04N 21/4882* (2013.01); *H04N 21/854* (2013.01); *G11B 27/34* (2013.01); *G11B 2220/2537* (2013.01)

(56) References Cited

U.S. PATENT DOCUMENTS

| | | | |
|---|---|---|---|
| 6,486,896 B1 | 11/2002 | Ubillos | |
| 6,711,293 B1 | 3/2004 | Lowe | |
| 7,050,603 B2 | 5/2006 | Rhoads et al. | |
| 7,058,891 B2 | 6/2006 | O'Neal et al. | |
| 7,477,268 B2 | 1/2009 | Veolia | |
| 7,836,044 B2 | 11/2010 | Kamvar et al. | |
| 7,934,233 B2 | 4/2011 | Zimmerman et al. | |
| 7,944,445 B1 | 5/2011 | Schorr et al. | |
| 7,956,847 B2 | 6/2011 | Christie | |
| 2003/0182663 A1 | 9/2003 | Gudorf et al. | |
| 2006/0282776 A1 | 12/2006 | Farmer et al. | |
| 2007/0038458 A1* | 2/2007 | Park | 704/270 |
| 2007/0294374 A1 | 12/2007 | Tamori | |
| 2008/0294694 A1 | 11/2008 | Maghfourian et al. | |
| 2009/0070699 A1* | 3/2009 | Birkill et al. | 715/772 |
| 2009/0083781 A1* | 3/2009 | Yang et al. | 725/20 |
| 2009/0116817 A1* | 5/2009 | Kim et al. | 386/95 |
| 2009/0164933 A1* | 6/2009 | Pederson et al. | 715/772 |
| 2009/0238460 A1 | 9/2009 | Funayama et al. | |
| 2009/0265737 A1 | 10/2009 | Issa et al. | |
| 2010/0058253 A1* | 3/2010 | Son | 715/863 |
| 2010/0122174 A1 | 5/2010 | Snibbe et al. | |
| 2010/0185984 A1 | 7/2010 | Wright et al. | |
| 2011/0021251 A1 | 1/2011 | Linden | |
| 2011/0041080 A1 | 2/2011 | Fleischman et al. | |
| 2011/0099490 A1 | 4/2011 | Barraclough et al. | |
| 2011/0126105 A1 | 5/2011 | Isozu | |
| 2011/0158605 A1 | 6/2011 | Bliss et al. | |
| 2011/0167347 A1* | 7/2011 | Joo et al. | 715/716 |
| 2011/0254800 A1* | 10/2011 | Anzures et al. | 345/173 |
| 2011/0283188 A1* | 11/2011 | Farrenkopf | G06F 3/0488 715/702 |
| 2012/0042246 A1* | 2/2012 | Schwesinger | G06F 3/017 715/716 |
| 2012/0223898 A1* | 9/2012 | Watanabe | G06F 3/0485 345/173 |
| 2012/0320091 A1* | 12/2012 | Rajaraman et al. | 345/629 |
| 2013/0004138 A1* | 1/2013 | Kilar et al. | 386/230 |
| 2013/0097551 A1* | 4/2013 | Hogan | G06F 3/04847 715/780 |
| 2013/0215279 A1* | 8/2013 | Rivas-Micoud et al. | 348/180 |
| 2014/0059434 A1* | 2/2014 | Anzures et al. | 715/720 |
| 2014/0215337 A1* | 7/2014 | Park et al. | 715/720 |
| 2015/0378503 A1* | 12/2015 | Seo | G06F 1/1641 345/173 |

FOREIGN PATENT DOCUMENTS

| | | |
|---|---|---|
| CN | 101867517 A | 10/2010 |
| JP | 2008-004134 A | 1/2008 |

OTHER PUBLICATIONS

Pongnumkul S. et al.: "Content-Aware Dynamic Timeline for Video Browsing", ACM Symposium on User Interface Software and Technology (UIST), Feb. 1, 2010, all pages.
PCT Search Report & Written Opinion, RE: Application #PCT/US2013/035714, dated Jun. 20, 2013.
PCT Search Report & Written Opinion, RE: Application #PCT/US2013/035702, dated Jun. 20, 2013.
Official Action, RE: Mexican Application No. MX/a/2014/013038, dated Feb. 16, 2016.
Official Action, RE: Korean Patent No. 10-2014-7032867; dated Oct. 19, 2015.
Examination Report, RE: European Application No. 13718435.4; dated Mar. 3, 2016.
Official Action, Re: Chinese Application No. 201380022218.0, dated May 2, 2017.
Official Action, RE: Mexican Application No. MX/a/2014/013038, dated Aug. 22, 2016.
Official Action, RE: Chinese Application No. 201380022218.0, dated Feb. 7, 2018.

\* cited by examiner

DISPLAY OF PRESENTATION ELEMENTS

CROSS-REFERENCE TO RELATED APPLICATIONS

The present application is related to U.S. patent application Ser. Nos. 13/457,520, 13/457,526, and 13/457,534, filed on an even date herewith.

FIELD OF THE INVENTION

The present invention is related generally to displaying a plurality of presentation elements.

BACKGROUND OF THE INVENTION

The consumption of media presentations by users (i.e., media consumers) is common. Here, "media presentation" or "multimedia presentation" refers to any digital content, including but not limited to video, audio, and interactive files. Also, "consumption" refers to any type of human interaction with a media presentation, including but not limited to watching, listening to, and interacting with the presentation.

Users can provide commentary upon points or periods of interest in a multimedia presentation. For example, a user may comment on an event occurring in the media presentation that is meaningful in the context of the multimedia presentation. Typically, users communicate these comments to other users. This communication, or sharing, of a user's comments may be achieved via, for example, online social media services (e.g., social networking websites), weblogs (i.e., "blogs"), and online forums.

BRIEF SUMMARY

The above considerations, and others, are addressed by the present invention, which can be understood by referring to the specification, drawings, and claims. According to aspects of the present invention, a plurality of presentation elements are displayed (e.g., to a user on an end-user device such as a touch-screen computer).

A progress bar and a communication box are displayed. A length of the progress bar is representative of duration (i.e., a length or domain) of a multimedia presentation. The progress bar may comprise a marker which moves along the length of the progress bar as the multimedia presentation is consumed by the user. A position of the marker along the length of the progress bar indicates a particular point in the multimedia presentation.

The communication box comprises a further marker and a communication composed by an originator in relation to a certain point or time period within the multimedia presentation. For example, the communication may be a comment made in relation to an event in the multimedia presentation by a consumer of that presentation. The communication box may also comprise an indication of the date and time that the communication was composed by the originator. The progress bar and the communication box are displayed such that the further marker of the communication box is in alignment with a position along the length of the progress bar that corresponds to the point or time period in the multimedia presentation in relation to which the communication in the communication box was composed.

Thus, comments and communications made by parties can be displayed in such a way so that it is easy to see what parts of a multimedia presentation those comments relate to.

The position of the further marker with respect to the progress bar or the rest of the communication box may (e.g., by a user performing an action) be moved such that the further marker may be aligned with a different position along the length of the progress bar. This may for example be achieved by the user sliding his finger across the progress bar displayed on a touch-screen display. Thus, the point or period in the multimedia presentation that the communication in the communication box is related to may be changed. Also, the communication box may (e.g., by a user performing a further action) be modified to comprise a second further marker in addition to the further marker. This second further marker may be moved in the same way as the further marker. Thus, the communication in the communication box may be made to relate to more than one point or range in the multimedia presentation.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
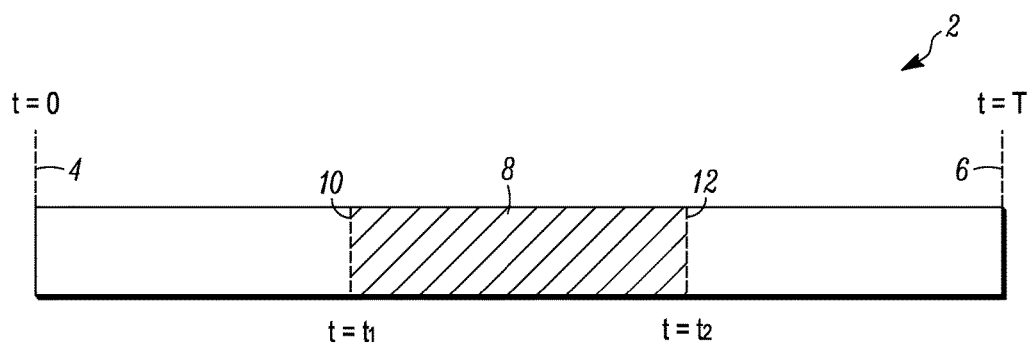
FIG. 1 is a schematic illustration (not to scale) showing a TV program.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Apparatus for implementing any of the below described arrangements, and for performing any of the below described method steps, may be provided by configuring or adapting any suitable apparatus, for example one or more computers or other processing apparatus or processors, or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the Figures, FIG. 1 is a schematic illustration (not to scale) showing a TV program 2. The TV program 2 is used herein to illustrate embodiments of the invention. It will be appreciated that in other embodiments a different type of media presentation or multimedia content (e.g., a radio broadcast, an ebook) may be processed. The TV program 2 may be consumed by the user using any appropriate client device (e.g., a laptop computer, a tablet computer, a television). The TV program 2 runs from its start time 4 at time t=0 to its end time 6 at time t=T. In embodiments in which the media presentation is, e.g., an ebook, the media presentation may run from 'page 1' to 'page N' (where N is the number of pages in the ebook). Thus, as opposed to being a time-based medium, a media presentation may be non-time-based. The media presentation may also comprise a multi-device presentation, i.e., a multimedia presentation to be shown on more than one different device. For example, the media presentation may comprise a slide presentation to be shown by one device and a video presentation to be shown by another device.

A portion of the TV program 2 (hereinafter referred to as the "portion" and shown in FIG. 1 as a shaded region of the TV program 2 and indicated by the reference numeral 8) has start and end demarcation points (indicated in FIG. 1 by the reference numerals 10 and 12 respectively). The start demarcation point 10 of the portion 8 occurs in the TV program 2 at time t=t1. The end demarcation point 12 of the portion 8 occurs in the TV program 2 at time t=t2. The start demarcation point 10 may be any time point in the TV program 2 between t=0 and t=T. The end demarcation point 12 may occur at any time point in the TV program that is equal to or later than the start demarcation point 10.

Figure 2:
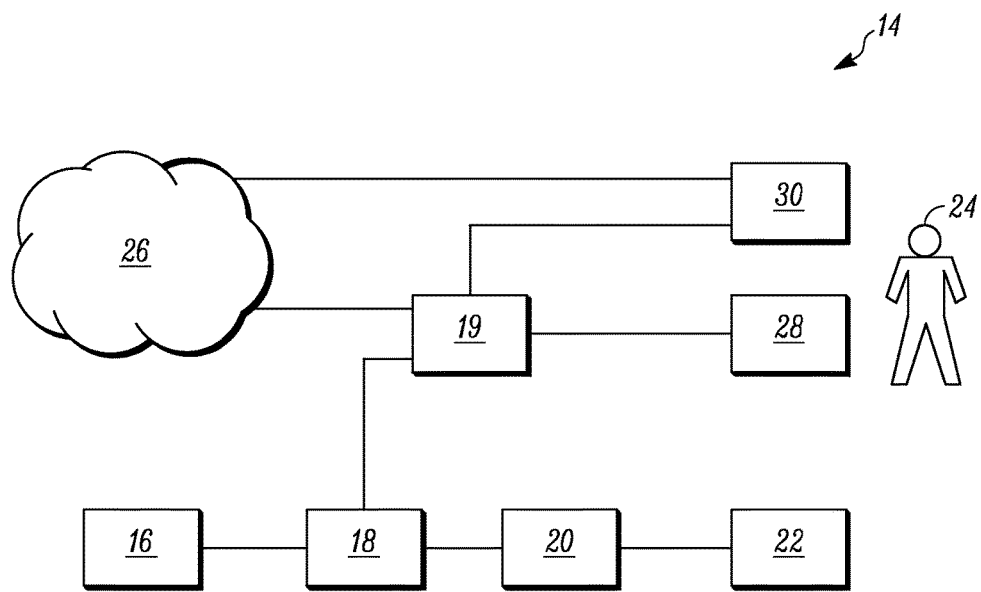
FIG. 2 is a schematic illustration (not to scale) of an example network.

FIG. 2 is a schematic illustration (not to scale) of an example network 14. A process, as performed by the entities of the network 14, is described in more detail below with reference to FIG. 6.

The representative network 14 comprises a service operator 16, a video server 18, a multimedia server 19, a set-top box 20, a television 22, a user 24, the Internet 26, a database 28, and a tablet computer 30.

The service operator 16 comprises apparatus that provides a television feed corresponding to the TV program 2. The service operator 16 is coupled to the video server 18 (e.g., either by a wireless or wired connection) such that, in operation, the service operator 16 provides the television feed to the video server 18.

The video server 18 (e.g., a cable head-end) is a facility for receiving, processing, and re-distributing television signals (e.g., the television feed). In addition to being coupled to the service operator 16, the video server 18 is coupled (e.g., either by a wireless or wired connection) to the multimedia server 19 and to the set-top box 20.

In operation, the video server 18 inter alia receives the television feed from the service operator 16. The video server 18 then processes the received television feed and distributes the processed feed (e.g., encoded in an appropriate multimedia container) to the multimedia server 19 and to the set-top box 20. The video server 18 and its functionality are described in more detail below with reference to FIGS. 3 and 6.

In addition to being coupled to the video server 18, the multimedia server 19 is coupled to the Internet 26, to the database 28, and to the tablet computer 30. The multimedia server 19 and its functionality are described in more detail below with reference to FIGS. 4 and 6.

In addition to being coupled to the video server 18, the set-top box 20 is also coupled to the TV 22. The set-top box 20 is a conventional device that, in operation, processes a multimedia container received from the video server 18 to provide content for display on the TV 22 (to the user 24).

The TV 22 is a conventional television on which, in operation, content from the set-top box 20 is displayed to the user 24.

The user 24 is a user of the TV 22, the database 28, and the tablet computer 30. For example, the user 24 may watch TV programs on the TV 22, store personal information in electronic form in the database 28, and browse the Internet 26 using the tablet computer 30. Furthermore, the user 24 is a subscriber to a service that allows the user 24 to upload comments and relevant information (e.g., onto the multimedia server 19) relating to media presentations that he has consumed or is currently consuming. For example, whilst the user 24 watches the TV program 2, the user 24 is able to upload (in electronic form) comments and content items relating to the TV program 2, e.g., relating to events occurring in the TV program 2, to the multimedia server 19 via the user's tablet computer 30 (as described in more detail below with reference to FIG. 6). The information uploaded to the multimedia server 19 that relates to a particular media presentation may be provided (by the video server 18) for consumption by other consumers of the media presentation, as described in more detail below with reference to FIG. 7. This service further allows the user 24 to access information uploaded by other parties (e.g., as described below with reference to FIG. 7).

The database 28 is storage for personal electronic information of the user 24. In other words, the database 28 is used by the user 24 to store the user's personal electronic content. The personal content stored by the user may include, but is not limited to, photographs, home-movies, and text documents. The database 28 may reside in a device used, owned, or operated by the user 24, for example a computer of the user 24, e.g., a laptop computer or the tablet computer 30.

The tablet computer 30 is a conventional tablet computer. In addition to being coupled to the multimedia server 19, the tablet computer 30 has access to the Internet 26 (e.g., via Wi-Fi Internet access). In other embodiments, a different type of device may replace the tablet computer 30, e.g., a different type of computer such as a laptop computer or a "smartphone." The tablet computer 30 is configured to allow the user 24 to input a comment relating to a media presentation (e.g., the TV program 2) that the user 24 has consumed or is consuming. For example, the user 24 may type such a comment on to the tablet computer 30. The tablet computer 30 may then upload the user's comment and content items onto the multimedia server 19, e.g., via a wired or wireless link, or via the Internet 26. The tablet computer is described in more detail below with reference to FIG. 5.

Figure 3:
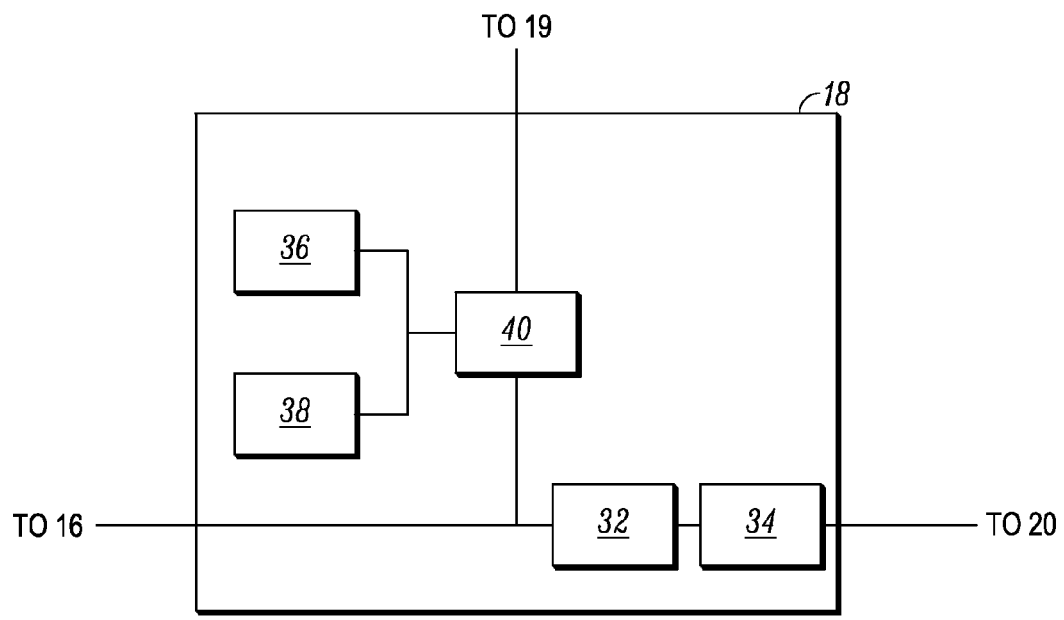
FIG. 3 is a schematic illustration (not to scale) of a video server.

FIG. 3 is a schematic illustration (not to scale) of the video server 18.

The video server 18 comprises a Transport Stream (TS) encoder 32, a transmitter 34, an Electronic Program Guide (EPG) service module 36, a closed-caption service module 38, and a media analysis module 40.

The TS encoder 32 is for encoding information into an appropriate Multimedia Container for transmission to the set-top box 20. The TS encoder 32 is coupled to the service provider 16 and to the transmitter 34 such that the TV feed may be received by it from the service provider 16, encoded, and delivered to the transmitter 34.

The transmitter 34 is coupled to the set-top box 20 such that information (e.g., the TV feed) encoded by the TS encoder 32 is transmitted to the set-top box 20.

The EPG service module 36 is a provider of broadcast programming or scheduling information for current and upcoming TV programs. The EPG service module 36 is coupled to the media analysis module 40 such that information may be sent from the EPG service module 36 to the media analysis module 40.

The closed-caption service module 38 is a provider of closed caption information (i.e., sub-titles) for current and upcoming TV programs. The closed captions may be in any appropriate language. The closed-caption service module 38 is coupled to the media analysis module 40 such that information may be sent from the closed-caption service module 38 to the media analysis module 40.

In addition to being coupled to the EPG service module 36 and to the closed-caption service module 38, the media analysis module 40 is coupled to the service operator 16 such that, in operation, it receives the TV feed provided by the service module 16. The media analysis module 40 is for analyzing and processing the received television feed, programming information, and closed caption information, as described in more detail below with reference to FIG. 6. Also, the media analysis module 40 is coupled to the multimedia server 19 such that output from the media analysis module 40 may be sent to the multimedia server 19.

Figure 4:
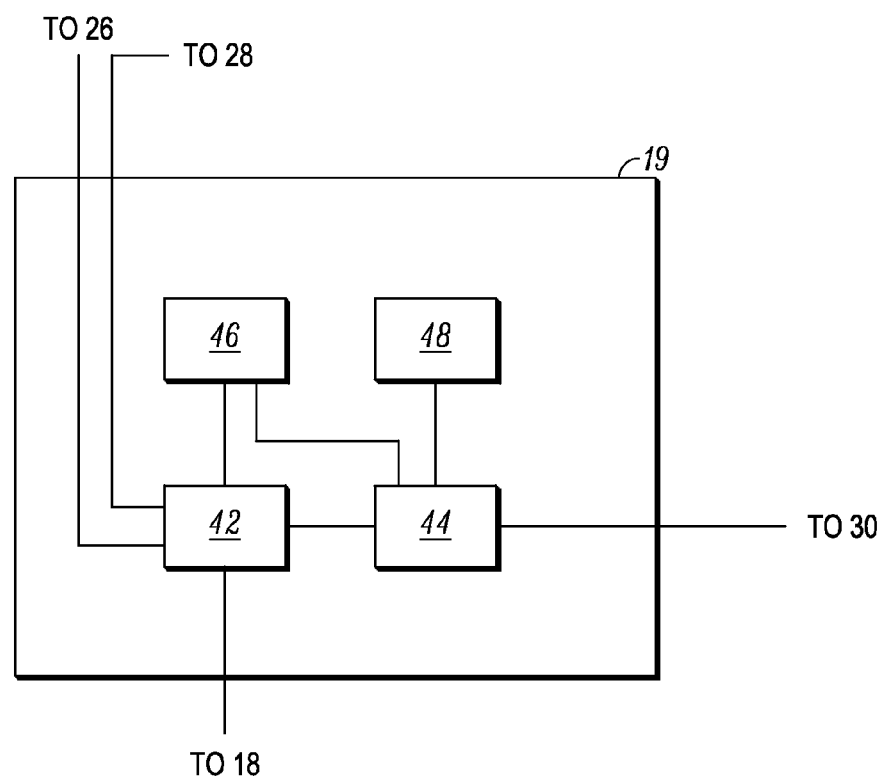
FIG. 4 is a schematic illustration (not to scale) of a multimedia server.

FIG. 4 is a schematic illustration (not to scale) of the multimedia server 19.

The multimedia server 19 comprises a content recommendation module 42, a comment service module 44, a comment analysis module 46, and a further database 48.

The media analysis module 40 (of the video server 18) is coupled to the content recommendation module 42 such that output from the media analysis module 40 may be sent to the content recommendation module 42.

In addition to being coupled to the media analysis module 40, the content recommendation module 42 is coupled to the comment analysis module 46. This is so that the content recommendation module 42 may receive and process the output from the media analysis module 40 and output from the comment analysis module 46. Also, the content recommendation module 42 is coupled (e.g., by a wired or wired-less connection) to the Internet 26 and to the database 28. This is so that the content recommendation module 42 may retrieve content over the Internet 26 (e.g., from a web-server not shown in the Figures) and may retrieve content (e.g., the user's personal pictures or movies) from the database 28. Also, the content recommendation module 42 is coupled to the comment service module 44. This is so that output from the content recommendation module 42 may be sent to the comment service module 44. The operation of the content recommendation module 42 is described in more detail below with reference to FIG. 6.

In addition to being coupled to the content recommendation module 42, the comment service module 44 is coupled (e.g., by a wired or wired-less connection) to the tablet computer 30. This is so that information may be sent from the tablet computer 30 to the comment service module 44 and vice versa. In other embodiments, the comment service module 44 may also be coupled to the TV 22 such that information may be sent from the TV 22 to the comment service module 44 and vice versa. Also, the comment service module 44 is coupled to the comment analysis module 46 and to the further database 48. This is so that information may be sent from the comment service module 44 to each of the comment analysis module 46 and the further database 48, as described in more detail below with reference to FIG. 6.

The comment analysis module 46 is for analyzing and processing an output of the comment service module 44, as described in more detail below with reference to FIG. 6. In operation, an output of the comment analysis module 46 is sent from the comment analysis module 46 to the comment recommendation module 42.

The further database 48 is for storing data received by it from the comment service module 44.

Figure 5:
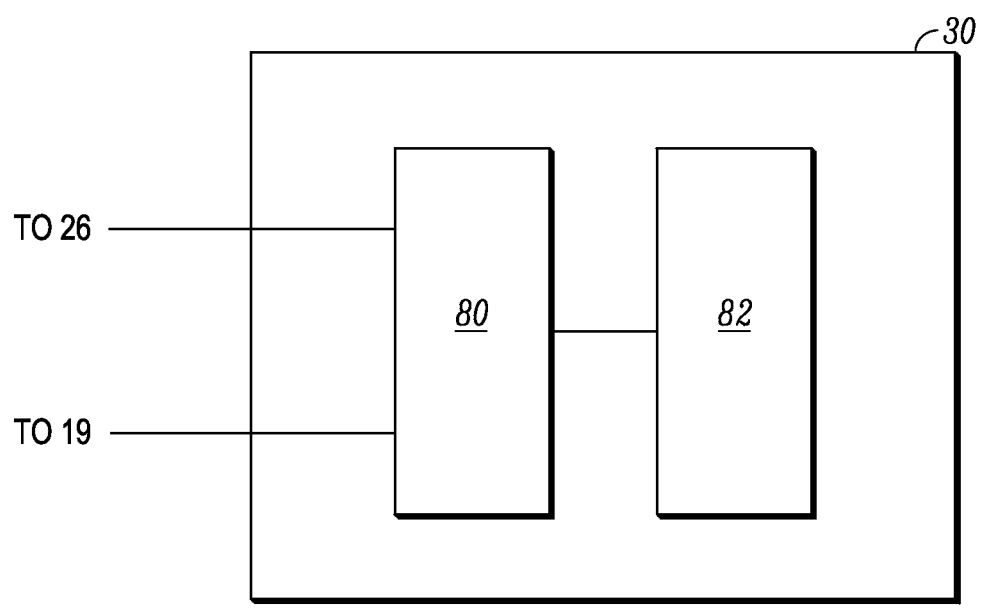
FIG. 5 is a schematic illustration (not to scale) of a tablet computer.

FIG. 5 is a schematic illustration (not to scale) of the tablet computer 30.

The tablet computer 30 comprises a processor 80 and a display 82 (operatively connected to the processor 80).

The processor 80 is connected (e.g., via a wireless link) to the Internet 26 and to the multimedia server 19 so that the processor 80 may receive information over the Internet 26 and from the multimedia server 19. Also, the processor 80 is configured to send (i.e., transmit) information over the Internet 26 and to the multimedia server 19. Thus, the processor 80 acts as a transmitting module and a receiving module for the tablet computer 30.

The display 82 is a touch-screen display. The user 24 may input information to the tablet computer 30 using the display 82.

The processor 80 and the display 82 are coupled such that the processor 80 may send information to the display 82 for displaying to the user 24. Also, the processor 80 may receive information input to the tablet computer 30 by the user 24 using the display 82.

The processor 80 is arranged to process received information in accordance with the below described methods.

Figure 6:
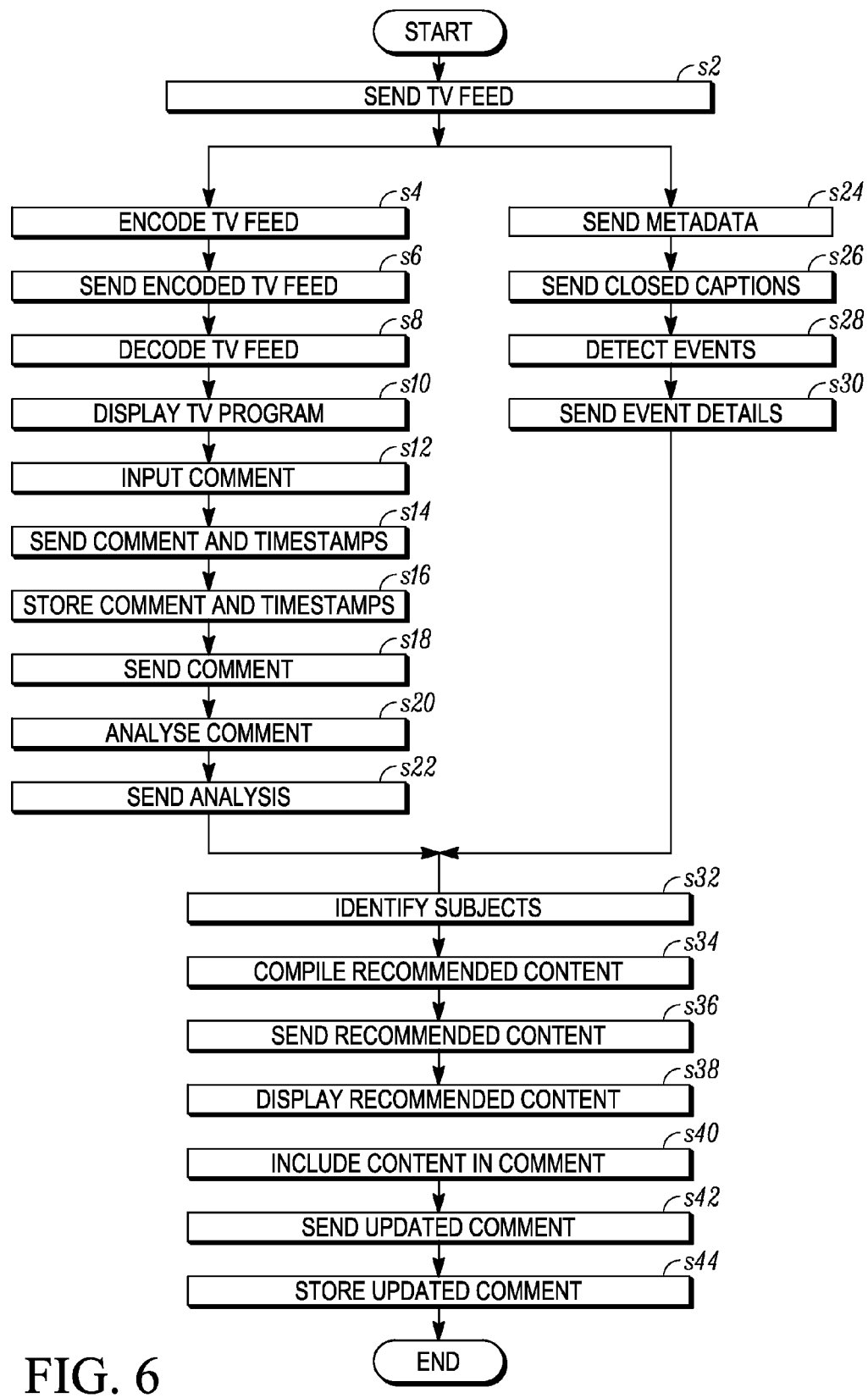
FIG. 6 is a process flow chart showing certain steps of a method performed by the entities in the network.

FIG. 6 is a process flow chart showing certain steps of a method performed by the entities in the network 14.

At step s2, the TV feed corresponding to the TV program 2 is sent from the service operator 16 to the TS encoder 32 and to the media analysis module 40 of the video server 18.

After step s2 the method proceeds to both step s4 and step s24. Step s24 is described in more detail below after a description of steps s4 through s22.

At step s4, the TS encoder 32 encodes the television feed for the TV program 2 that it received from the service operator 16. The encoded television feed may be inserted into an appropriate Multimedia Container. Examples of a Multimedia Container include the MPEG Transport Stream, Flash Video, and QuickTime. The MPEG Transport Stream may comprise, for example, audio elementary streams, video elementary streams, closed-caption or subtitle elementary streams, and a Program Address table. The TV feed, as it may comprise text, audio, video, and other type of information (such as graphical composition and animation information), may be separately carried by other types of elemental streams in the same transport stream, such as the video, audio, text, and private user data elemental streams.

At step s6, the encoded Multimedia Container is sent from the TS encoder 32, via the transmitter 34, to the set-top box 20.

At step s8, the set-top box 20 decodes the received Multimedia Container.

At step s10, the content (from the decoded Multimedia Container), i.e., the TV feed, is displayed to the user 24 on the TV 22.

At step s12, as the user 24 watches the TV program 2, the user 24 types (or inputs in some other way) a comment relating to the TV program 2 (e.g., to events occurring in the TV program 2) on to the tablet computer 30 (using the display 82).

At step s14, the user's comment relating to the TV program 2 is transmitted from the tablet computer 30 (e.g., via the processor 80) to the comment service module 44 of the multimedia server 19.

The comment may be sent from the tablet computer 30 as the user 24 is inputting the comment, i.e., a partial comment may be transmitted. This may be done such that the steps s16 through s38 described below are performed whilst the user 24 is still composing the comment. Alternatively the comment may be transmitted from the tablet computer 30 after the user 24 has finished composing it.

Furthermore, at step s14, a first time-stamp relating to the comment is transmitted from the tablet computer 30 to the comment service module 44 of the multimedia server 19. This first time-stamp is indicative of a point in time in the TV program 2 (i.e., a time between the start time 4, t=0, and the end time 6, t=T, of the TV program 2) corresponding to which the user 24 makes the comment. For example, the first time-stamp may indicate the time in the TV program 2 that a certain event occurs, the certain event being an event with respect to which the user 24 makes the comment.

Furthermore, at step s14, a second time-stamp relating to the comment is transmitted from the tablet computer 30 to the comment service module 44 of the multimedia server 19. This second time-stamp is indicative of a date and time of day at which the user 24 makes the comment.

At step s16, the user's comment and the associated first and second time-stamps are stored by the comment service module 44 at the further database 48.

At step s18, the user's comment is sent from the comment service module 44 to the comment analysis module 46.

At step s20, the comment analysis module 46 analyses the received user's comment. Any appropriate process for analyzing the user's comment may be implemented. For example, conventional keyword detection processes and parsing processes may be used to analyze a text form of the user's comment.

At step s22, the results of the analysis of the user's comment performed by the comment analysis module 46 (e.g., the extracted key-words or the parsed comment) is sent from the comment analysis module 46 to the content recommendation module 42.

After step s22, the method proceeds to step s32, which is described below after the description of steps s24 through s30.

At step s24, the EPG service module 36 sends metadata corresponding to the TV program 2 (e.g., the start time 4 and end time 6 of the TV program 2, the type of the TV program 2, genre of the TV program 2, cast and crew names of the TV program 2, the parental advisory rating of the TV program 2, etc.) to the media analysis module 40.

At step s26, the closed-caption service module 38 sends closed caption information for the TV program 2, in the appropriate languages, to the media analysis module 40.

At step s28, using the metadata received from the EPG service module 36, the closed caption information received from the closed-caption service module 38, and the TV feed received from the service operator 16, the media analysis module 40 analyses the television feed to detect content events, hereinafter referred to as "events," within the TV program 2. The terminology "event" is used herein to refer to a point or period of interest in a multimedia presentation (e.g., the TV program 2). The point or period of interest in the multimedia presentation is meaningful in the context of the multimedia presentation. Examples of events include an action sequence in a movie, a home-run in a televised baseball game, a goal in a televised soccer match, and a commercial break in a TV program. The analysis performed by the media analysis module 40 is any appropriate type of analysis such that events occurring within the TV program 2 may be detected. For example, a conventional process of analyzing audio, video, or closed caption (sub-title) text to detect content events may be used. For example, a period of increased sound levels in a televised soccer match tends to be indicative of an event (e.g., a goal). Also, for example, an instance of a completely black screen in a movie tends to be indicative of an event (e.g., a cut from one scene to the next).

At step s30, information relating to one or more of the detected events (e.g., the type of event, closed caption data corresponding to an event, the time the event occurred with respect to the TV program, the duration of the event, etc.) is sent from the media analysis module 40 to the content recommendation module 42.

At step s32, using the comment analysis received from the comment analysis module 46 and the event information received from the media analysis module 40, the content recommendation module 42 identifies one or more subjects, or topics, related to the user's comment or related to the event occurring in the TV program 2 that the user 24 is commenting on. This may be performed, for example, by comparing the analysis of the user's comment with the information relating to that event. For example, keywords extracted from the user's comment may be compared to the closed captions that relate to that event or to a text description of that event.

The identification of the one or more topics may further depend on user behaviour (e.g., the user's web-browsing history, etc.) or properties of the user 24 (e.g., a profile of the user 24, the user's likes, dislikes, hobbies, interests, etc.). The identification of the one or more topics may instead, or also, depend upon properties of the intended recipients of the comment (i.e., the party or parties that the user 24 intends, i.e., has indicated, the comment to be viewed by). The identification of the one or more topics may instead, or also, depend upon previous comments made by the user or by a different party (e.g., made in relation to the multimedia presentation).

At step s34, the content recommendation module 42 identifies content that relates to the one or more subjects or topics identified at step s32. This may be performed by the content recommendation module 42 searching on the Internet 26 (e.g., using a Web search engine) for information related to those subjects. Also, the content recommendation module 42 may search the database 28 for information (e.g., pictures or documents) related to those subjects. The content recommendation module 42 selects some or all of the identified content items. For example, the content recommendation module 42 may download some or all of the identified content items. Also, the content recommendation module 42 may compile a list of links or references (e.g., hyperlinks) to some or all of the identified content items.

The selection of some or all of the identified content items may depend on one or more other factors, e.g., user behaviour (e.g., the user's web-browsing history, etc.), properties of the user 24 (e.g., a profile of the user 24, the user's likes, dislikes, hobbies, interests, etc.), properties of the intended recipients of the comment (i.e., the party or parties that the user 24 intends, i.e., has indicated, the comment to be viewed by), or previous comments made by the user or by a different party (e.g., made in relation to the multimedia presentation).

The set of all the downloaded or selected content items and the list of references is hereinafter referred to as the "recommended content." The terminology "recommended content" refers to content that is identified and selected by the content recommendation module 42 and will be recommended to the user 24 as being relevant to, e.g., the comment or the event in relation to which the comment is made. The recommended content may include, but is not limited to, links to websites, news articles, and downloaded documents or pictures (e.g., maps downloaded from a web-server via the Internet 26 or personal pictures retrieved from the database 28).

The recommended content may also comprise, for one or more of the recommended content items (i.e., the downloaded content items and the recommended links) a recommended time in the TV program 2. A recommended time for a content item may be a time in the TV program that an event occurs to which the content item is related. A recommended time for a content item may be determined by the content recommendation module 42 (or by a different module) by, for example, analyzing the comment analysis (i.e., the output of the comment analysis module 46) and the event information (i.e., the output from the media analysis module 40). Also for example, a recommended time for a content item may be determined by analyzing comments of other users (e.g., that may be stored in the further database 48).

At step s36, the recommended content is sent from the content recommendation module 42 to the tablet computer 30 (via the comment service module 44). In other embodiments, the recommended content is sent from the content recommendation module 42 to the TV 22 for display to the user 24.

At step s38, the recommended content is displayed to the user 24 on the tablet computer 30 (on the display 82). In other embodiments, the recommended content is displayed on a different device, e.g., the TV 22. The recommended content may be displayed to the user 24 whilst the user 24 is still composing the comment or after the user 24 has initially finished composing the comment.

Figure 7:
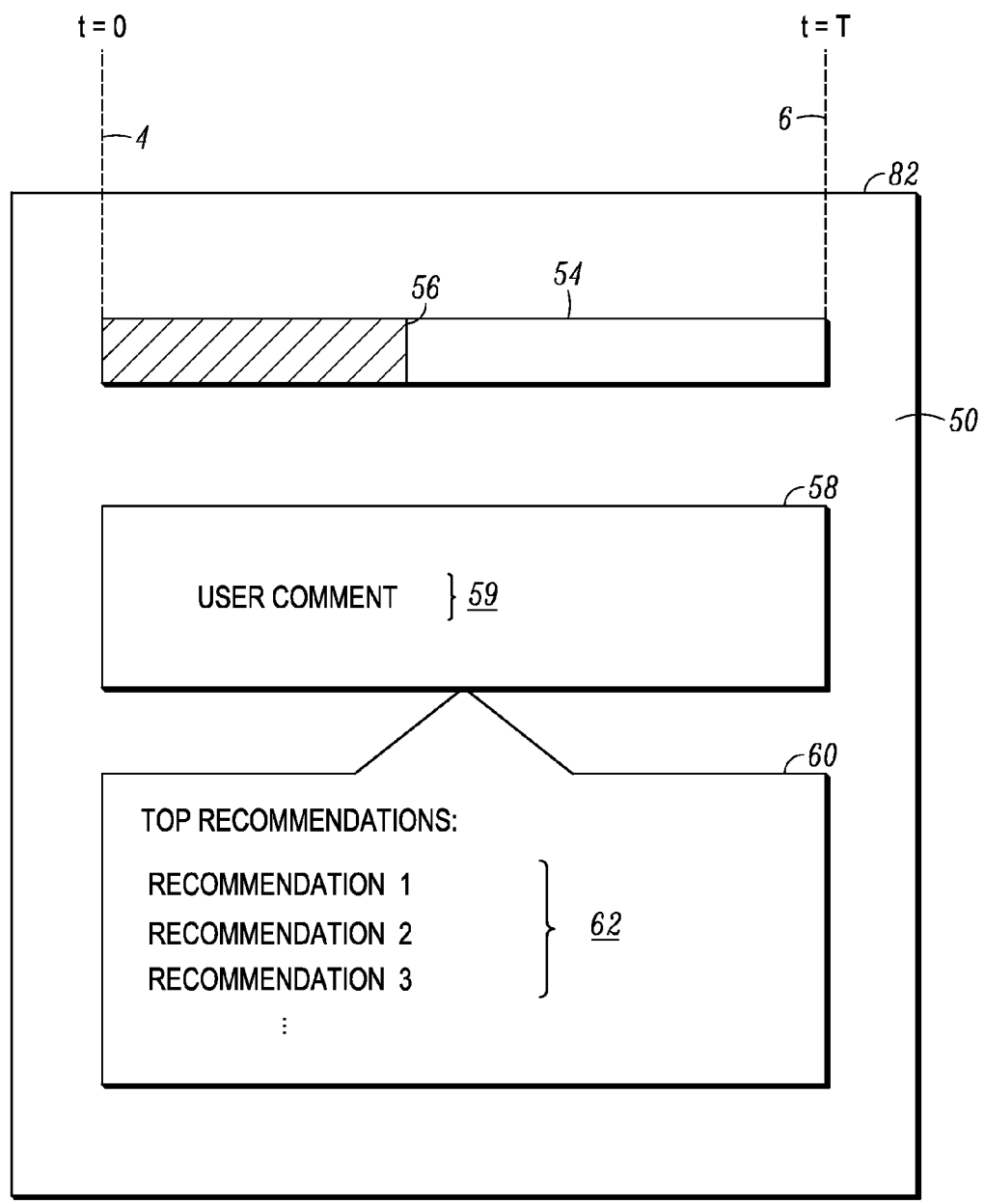
FIG. 7 is a schematic illustration (not to scale) of a first user interface.

FIG. 7 is a schematic illustration (not to scale) of an example of a user interface (UI), hereinafter referred to as the "first UI" and indicated in FIG. 7 by the reference numeral 50. The first UI 50 is displayed on the display 82 of the tablet computer 30. The first UI 50 comprises a progress bar 54 that conveys to the user 24 how much of the TV program 2 has been played and how much of the TV program 2 remains to be played. A shaded portion 56 of the progress bar 54 increases in length, along the length of the progress bar 54, from one end of the progress bar 54 (which corresponds to the start time 4, t=0, of the TV program 2) to the other end of the progress bar 54 (which corresponds to the end time 6, t=T, of the TV program 2). The first UI 50 further comprises a comment box 58 in which the user 24 types his comment 59. The first UI 50 further comprises a recommendations box 60 in which the recommended content 62 relating to the comment 59 in the comment box 58 (received at the tablet computer 30 from the content recommendation module 42) is displayed.

In other examples, a number of comments made by the user 24 may be displayed in the first UI 50 (e.g., in a number of other comment boxes). Recommended content relating to some or all of these other comments may also be displayed in the first UI 50 (e.g., in a number of other recommendations boxes).

Thus, content items that relate to a comment that the user 24 is in the process of composing may advantageously be displayed to the user 24 (as recommended content) as that comment is being composed. The user 24 may select (in a relatively simple and intuitive way) one or more of the recommended items for inclusion in the comment. The recommended content items advantageously tend to relate to both the comment being composed and to the events occurring in the TV program 2 at that time.

Returning now to FIG. 6, at step s40 the user 24 includes some or all of the recommended content 62 in his comment 59. The user 24 may decide to include some, all, or none of the recommended content 62 into his comment 59. For example, the user 24 may, using the first UI 50, select the content he wishes to include in the comment 59 from the recommendations box 60 and "drag-and-drop" that content into the comment box 58. Thus, the user 24 updates the comment to include recommended content (e.g., web-links to websites or personal pictures that are relevant to the comment 59 or to the event with respect to which the comment 59 was made). Also for example, in the first UI 50 a recommended content item 62 may be accompanied by a respective "Attach" button, which when selected by the user 24 results in that content item 62 being included in the comment box 58. In other embodiments, the user 24 may choose to attach one or more of the recommended content items 62 to the comment 59, e.g., by touching, pointing, or speaking a corresponding index. A list of recommended content is automatically updated, i.e., the recommended content list is refined, as the user 24 provides more information or edits the comment 59.

At step s42, the updated comment is sent from the tablet computer 30 to the comment service module 44.

At step s44, the comment stored in the further database 48 at step s16 is updated so that it is the same as the updated comment, i.e., such that it contains any recommended content included by the user 24 at step s40. This may be achieved in any appropriate way, e.g., by overwriting the original comment with the updated comment. In other embodiments, the original comment is not stored at step s16, and only once the comment has been updated to include any recommended content items desired by the user 24 is the comment stored.

Thus, at step s44 the updated comment (including recommended content) and the first and second time-stamps corresponding to that comment are stored at the multimedia server 19 in the further database 48.

Using the method described above with respect to FIG. 6, the user 24 may create one or more comments relating to the TV program 2. These comments may include content recommended to the user 24 by the content recommendation module 42 and that relates to the user's comment or events in the TV program 2 upon which the user 24 comments. Each comment is stored with a time in the TV program 2 at which that comment was made (i.e., a time relative to the TV program 2) and an absolute time (e.g., data and time) at which that comment was made.

Next described is an example way of using the information stored in the further database 48 (i.e., the stored comment and time-stamps).

Figure 8:
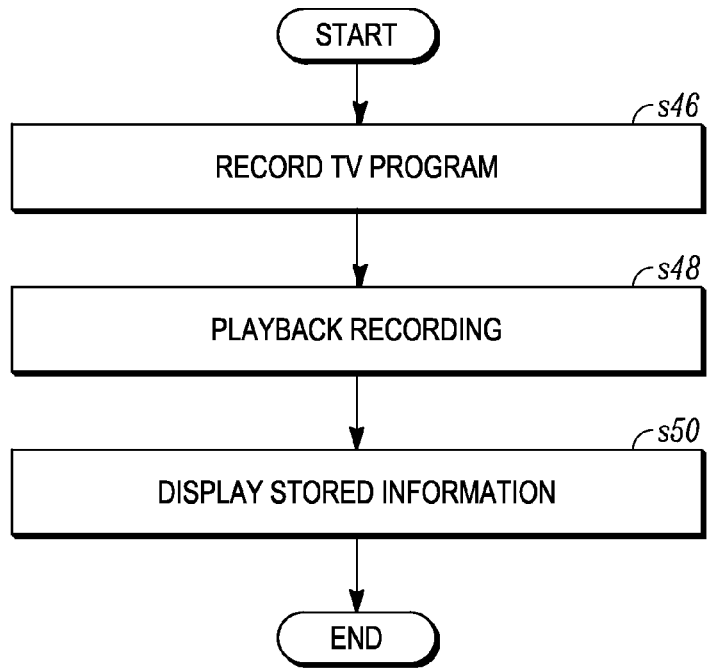
FIG. 8 is a process flow chart showing certain steps of a method of using comment and time-stamps information.

FIG. 8 is a process flow chart showing certain steps in an example method of using the comment and time-stamps stored in the further database 48.

At step s46, a further user records (e.g., using a digital video recording device) the TV program 2. The further user is a subscriber to the service that allows him to access comments stored on the further database 48 (made, e.g., by the user 24) and to upload his own comments to the further database 48. The TV program 2 is to be watched by the further user at a time that is after the TV program 2 has been watched and commented on by the user 24.

At step s48, sometime after the TV program 2 has been recorded by the further user, the further user watches (e.g., on a further TV) the recording of the TV program 2.

At step s50, whilst watching the recording of the TV program 2, the further user displays (e.g., on a further tablet computer or other companion device, of which he is a user) the information stored in the further database 48. This information may be displayed as described below with reference to FIG. 9.

Figure 9:
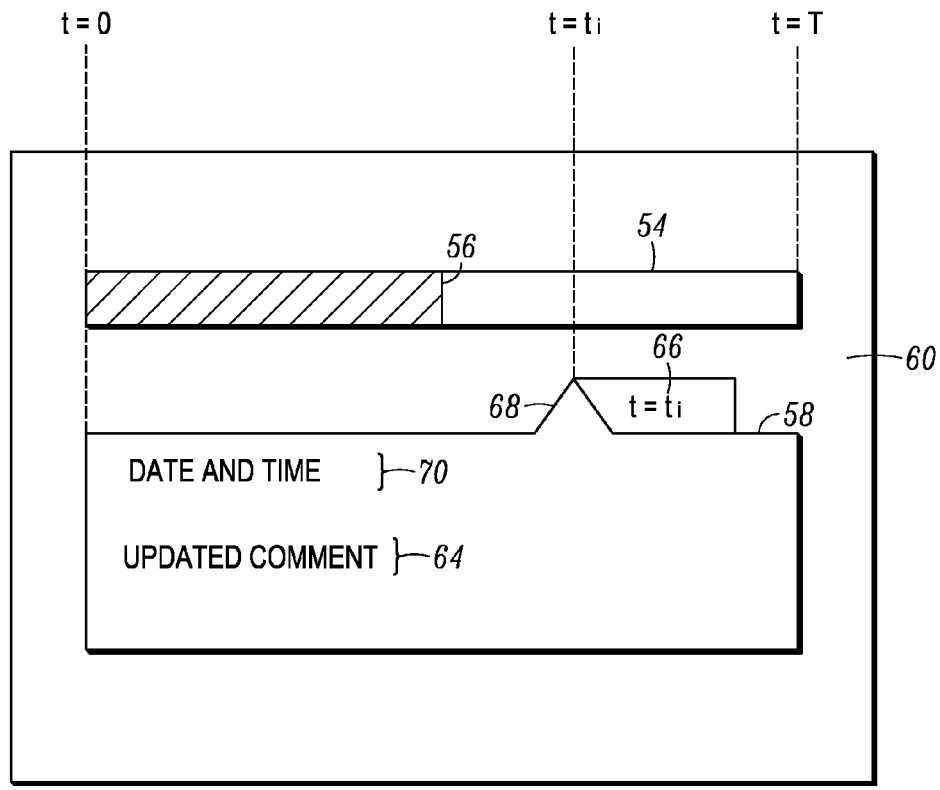
FIG. 9 is a schematic illustration (not to scale) of a second user interface.

FIG. 9 is a schematic illustration (not to scale) of an example of a user interface, hereinafter referred to as the "second UI" and indicated in FIG. 9 by the reference numeral 60.

Similar to the first UI 50 described above with reference to FIG. 7, the second UI 60 comprises the progress bar 54 that conveys to the further user how much of the TV program 2 has been played and how much remains to be played (this is indicated by means of the shaded portion 56).

The second UI 60 further comprises a comment box 58 which displays the user's updated comment 64 (i.e., the user's comment including any recommended content he wishes to include). The comment box 58 also displays the first time-stamp 66 (i.e., the time-stamp indicative of the time relative to the TV program 2 at which the user 24 makes the comment). The comment box 58 comprises a marker 68. The position of this marker 68 with respect to the progress bar 54 corresponds to the position of the first time-stamp 66 in the TV program 2. In other words, if the first time-stamp 66 indicates that the updated comment 64 corresponds to a time t=ti in the TV program 2, then the marker 68 of the comment box 58 that contains the updated comment 64 is aligned with the time t=ti of the progress bar 54. Also, the comment box 58 displays the second time-stamp 70 (i.e., the time-stamp indicative of the date and time of day at which the user 24 made the updated comment 64).

Thus, as the further user watches the TV program 2, he is able to view the comments the user 24 made on the TV program 2 (including any content the user 24 included in the comments). The further user is also able to view the time with respect to the TV program 2 each comment was made by the user 24. The further user is also able to view the respective absolute time (i.e., date and time of day) at which each comment was made by the user 24. Thus, the user 24 is able to communicate his opinions on the TV program 2 (and any related content items) relatively easily to the further user.

The second UI 60 advantageously provides a relatively simple and intuitive user interface. This interface may be used by a user to view or interact with comments and other information provided by other users and relating to a media presentation. The provided comments and related information may be consumed by a user before, during, or after the consumption of the related media presentation.

The second UI 60 further provides an interface using which the user 24 may edit a comment or a timestamp associated with a comment. The comment to be edited, or the comment associated with the timestamp to be edited, may have been made by any user (i.e., by the user performing the editing or by a different user). Methods of performing such editing are described below with reference to FIGS. 10 through 13.

Figure 10:
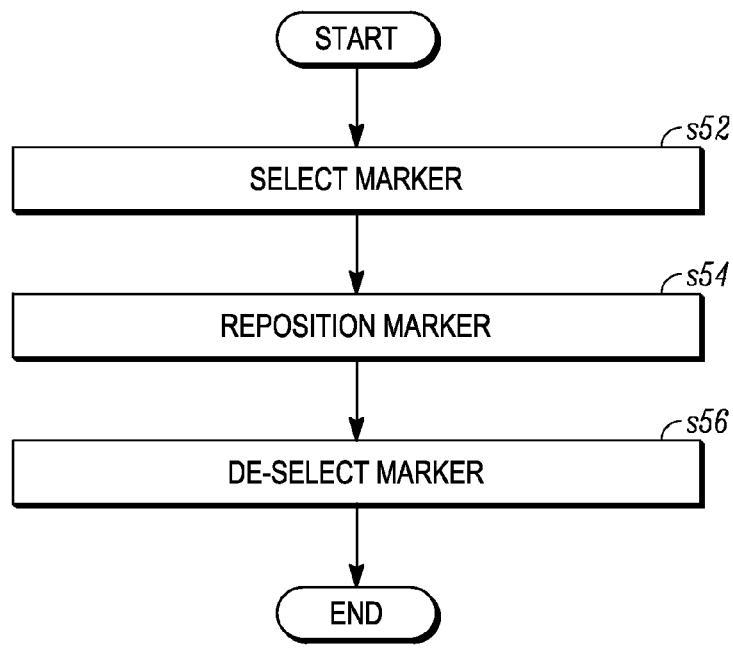
FIG. 10 is a process flow chart showing certain steps of a method by which a first timestamp may be edited.

FIG. 10 is a process flow chart showing certain steps of a method by which the user 24 may edit a first timestamp 66 associated with a comment. This may be done by interacting with the second UI 60. In this example, the user 24 wishes to change the first timestamp 66 of a comment from t=tj to t=tk (i.e., the user 24 wishes a comment to be associated with the new point t=tk in the TV program 2 as opposed to the point t=tj that it is currently associated with).

At step s52, the user 24 selects the marker 68 (corresponding to the timestamp to be edited) of the relevant comment box 58. This may be performed in any appropriate way. For example, if the second UI 60 is displayed on a touch-screen display (e.g., the display 82 of the tablet computer 30), then the user 24 may select the marker 68 by touching it (e.g., with a finger). Also for example, the marker 68 may be selected by the user 24 moving a mouse cursor over the marker and clicking a mouse button.

At step s54, once the marker 68 has been selected, the user 24 repositions the marker 68 (e.g., by using a "drag and drop" technique or by sliding the marker 68 along the top of its comment box 58) from an initial position (where the marker 68 is aligned with the point t=tj on the progress bar 54) to its new position (where the marker 68 is aligned with the point t=tk on the progress bar 54).

Figure 11:
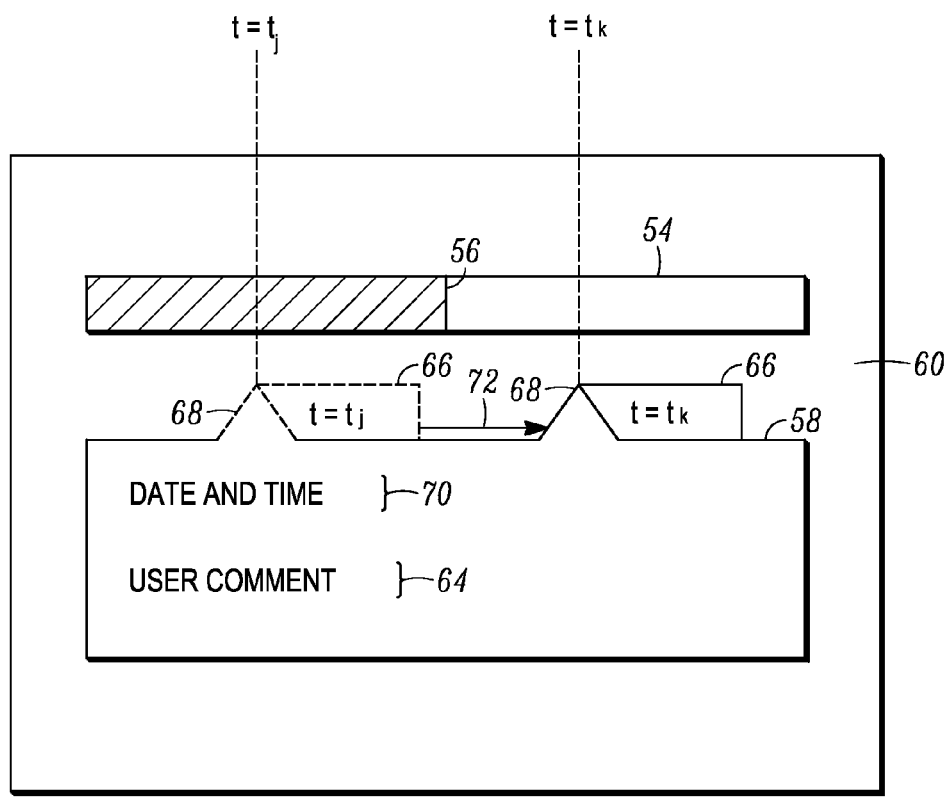
FIG. 11 is a further schematic illustration (not to scale) of the second user interface.

FIG. 11 is a further schematic illustration (not to scale) of the second UI 60. FIG. 11 shows the marker 68 of a comment box 58 moved from an initial position (at t=tj and indicated in FIG. 11 by dotted lines) to a new position (at t=tk and indicated in FIG. 11 by solid lines). The marker 68 is moved along such that it follows the solid arrow indicated in FIG. 11 by the reference numeral 72. This may be performed in any appropriate way. For example, if the second UI 60 is displayed on a touch-screen display, the user 24 may move the marker 68 by sliding his finger from the marker's original position (t=tj) to the marker's new position (t=tk). Also for example, the marker 68 may be moved by the user 24 by using a mouse controller and a "drag-and-drop" technique.

At step s56, the user 24 may de-select the marker 68 (e.g., by performing a further action).

Thus, the first timestamp 66 of a comment may advantageously be altered by a user 24 in a relatively simple and intuitive manner.

Figure 12:
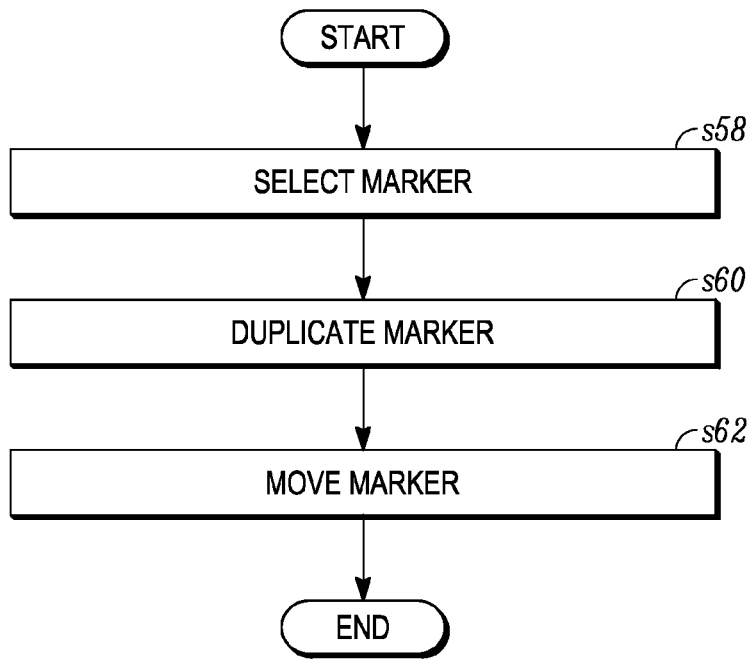
FIG. 12 is a process flow chart showing certain steps of an example method by which a comment may be associated with multiple first timestamps.
Figure 13:
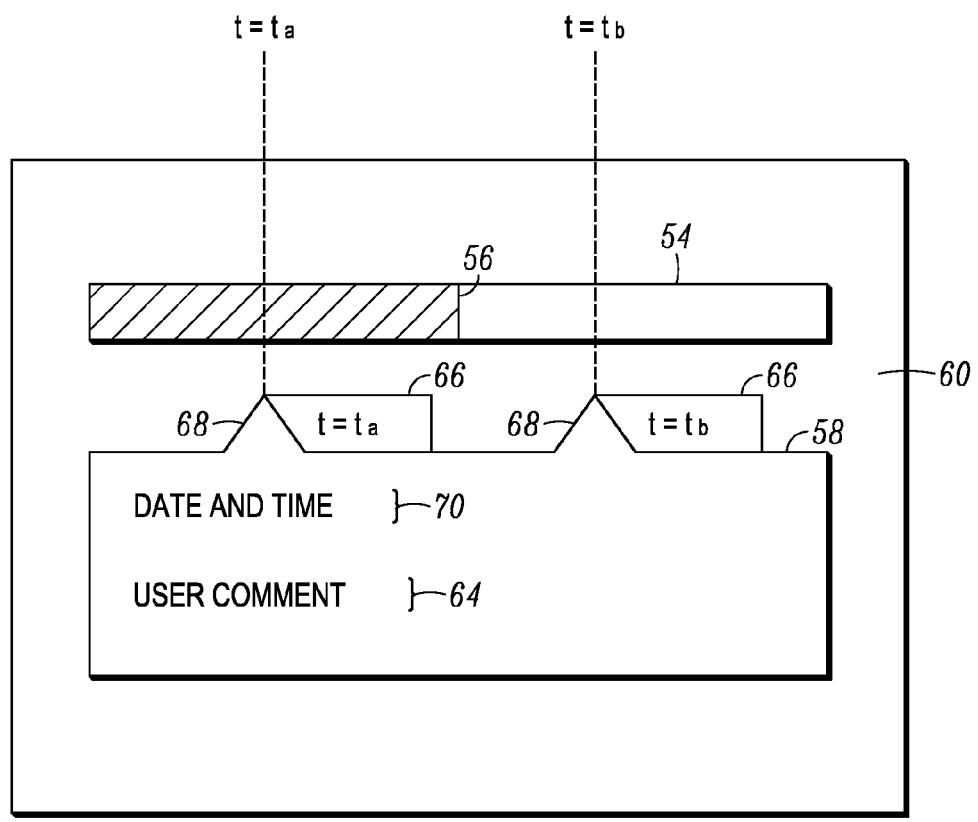
FIG. 13 is a further schematic illustration (not to scale) of the second user interface.

FIG. 12 is a process flow chart sowing certain steps of a method by which the user 24 may, using the second UI 60, associate a comment with multiple first timestamps 66. In this example, the user 24 wishes to further associate a comment (that is initially associated with a time-step in the TV program 2 at t=ta) with a further additional time-step (at t=tb). In other words, the user 24 wishes a comment box 58 to have two first timestamps (t=ta and t=tb), e.g., as shown in FIG. 13 which is described below after the description of steps s58 through s62 of FIG. 12.

At step s58, the user selects the marker 68 corresponding to the comment box 58 he wishes to associate with the additional further time-step. In other words, the user 24 selects the marker 68 corresponding to t=ta. This may be performed in any appropriate way, for example, as described above with reference to step s52 of FIG. 10.

At step s60, once the marker 68 has been selected, the user 24 creates a duplicate of the marker 68. This may be performed in any appropriate way. For example, the marker 68 may be copied using a conventional "copy and paste" technique or by performing some other action (e.g., tapping twice on a touch-screen display).

At step s62, the user moves one copy of the marker 68 to a new desired location. This may be performed using any appropriate process. For example, one or both copies of the marker 68 may be moved to desired positions by performing steps s52 through s56, as described above with reference to FIG. 10.

FIG. 13 is a further schematic illustration (not to scale) of the second UI 60. The comment box 58 in FIG. 13 comprises two first timestamps 66 and two corresponding markers 68 (at t=ta and t=tb), i.e., the comment box 58 shown in FIG. 13 is a comment box resulting from the user 24 performing the method of FIG. 12.

Thus, a single comment may be associated with a plurality of time-steps within the TV program 2 (e.g., by repeatedly performing the process of FIG. 12). This may be done in an advantageously simple and intuitive manner. This advantageously provides that a single comment box may be associated with more than one point in a media presentation. This tends to avoid the contents of comment boxes having to be duplicated.

The second UI 60 further provides an interface using which the user 24 may view comments (made by himself or by other users) made in relation to part of the TV program 2. The part of the TV program may be specified by the user 24. An example method of performing such a process is described below with reference to FIGS. 14 and 15.

Figure 14:
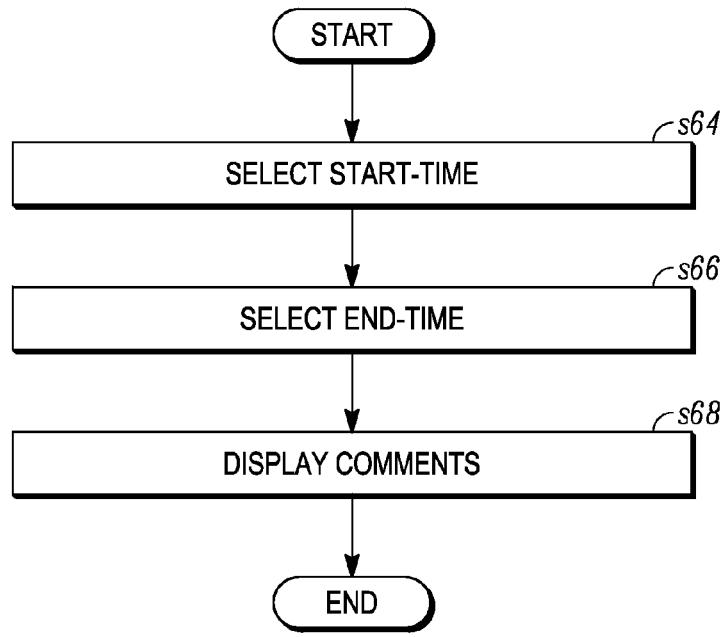
FIG. 14 is a process flow chart showing certain steps of an example method of specifying a portion of the TV program.

FIG. 14 is a process flow chart showing certain steps of an example method by which the user 24 may specify a part of the TV program 2 and display, using the second UI 60, comments (and content items) that relate to that part (i.e., comments that have first timestamps 66 within the specified part of the TV program 2). In this example, the user 24 wishes to display all comments that relate to a time in the TV program that is between t=tc and t=td (i.e., the user 24 wishes to display comments that have a first timestamp 66 that is between t=tc and t=td). In this example, tc is a time-step that is later (in the TV program 2) than the start time 4 of the TV program 2. Also, td is a time-step that is later (in the TV program 2) than tc. Also, td is a time-step that is earlier (in the TV program 2) than the end time 6 of the TV program 2.

At step s64, the user 24 selects a start (i.e., earliest) time-step for the part of the TV program 2 that he wishes to view the comments made in relation to. In this example, the user 24 selects the time-step t=tc. This may be performed in any appropriate way. For example, if the second UI 60 is displayed on a touch-screen display (e.g., of the tablet computer 30), then the user 24 may select the start-time by touching the progress bar 54 at the point corresponding to the desired start-time. The user 24 may change this selected time-step by, for example, sliding his finger to a new position on the progress bar 54 corresponding to the desired new start-time. Also for example, the start-time may be selected by the user 24 moving a mouse cursor over the point on the progress bar 54 corresponding to the desired start-time and clicking a mouse button.

At step s66, the user 24 selects an end (i.e., latest) time-step for the part of the TV program 2 that he wishes to view the comments made in relation to. In this example, the user 24 selects the time-step t=td. This may be performed in any appropriate way. For example, if the second UI 60 is displayed on a touch-screen display (e.g., of the tablet computer 30), then the user 24 may select the end-time by touching the progress bar 54 at the point corresponding to the desired end-time. The user 24 may change this selected time-step by, for example, sliding his finger to a new position on the progress bar 54 corresponding to the desired new end-time. Also for example, the end-time may be selected by the user 24 moving a mouse cursor over the point on the progress bar 54 corresponding to the desired end-time, and clicking a mouse button.

Steps s64 and s66 may advantageously be performed simultaneously in a relatively simple and intuitive manner. For example, if the second UI 60 is displayed on a touch-screen display (e.g., of the tablet computer 30), then the user 24 may select the start-time by touching the progress bar 54 at that corresponding point with one digit (e.g., the user's thumb), and simultaneously (or before or afterwards) the user 24 may select the end-time by touching the progress bar 54 at that corresponding point with another digit on the same hand (e.g., the user's forefinger). The user 24 may advantageously change the selected start or end time by, for example, sliding either or both of his digits along the progress bar 54 so that they contact new positions on the progress bar 54 corresponding to the desired new start and end times. The user 24 also change the length of the selected part by moving his digits (with which he has chosen the start and end times) closer together or further part. Thus, the user 24 may use a relatively simple "pinching" action (on the progress bar 54) to specify, i.e., select (and, if desired by the user 24, alter) the start and end times of a part of the TV program 2.

Thus, the user 24 effectively specifies a range of time (i.e., tc to td) within the TV program 2.

At step s68, the tablet computer 30 displays all the comment boxes 58 (and their respective contents) that have a first timestamp 66 that is within the specified range of time (i.e., between the start-time t=tc and the end-time t=td). A summary of the information contained in those comment boxes 58 may be displayed instead of or in addition to the comment boxes 58 themselves. The comment boxes 58 that are displayed at step s68 may be selected, e.g., from the set of all comment boxes 58, in any appropriate way, e.g., by the processor 80 of the tablet computer 30.

Figure 15:
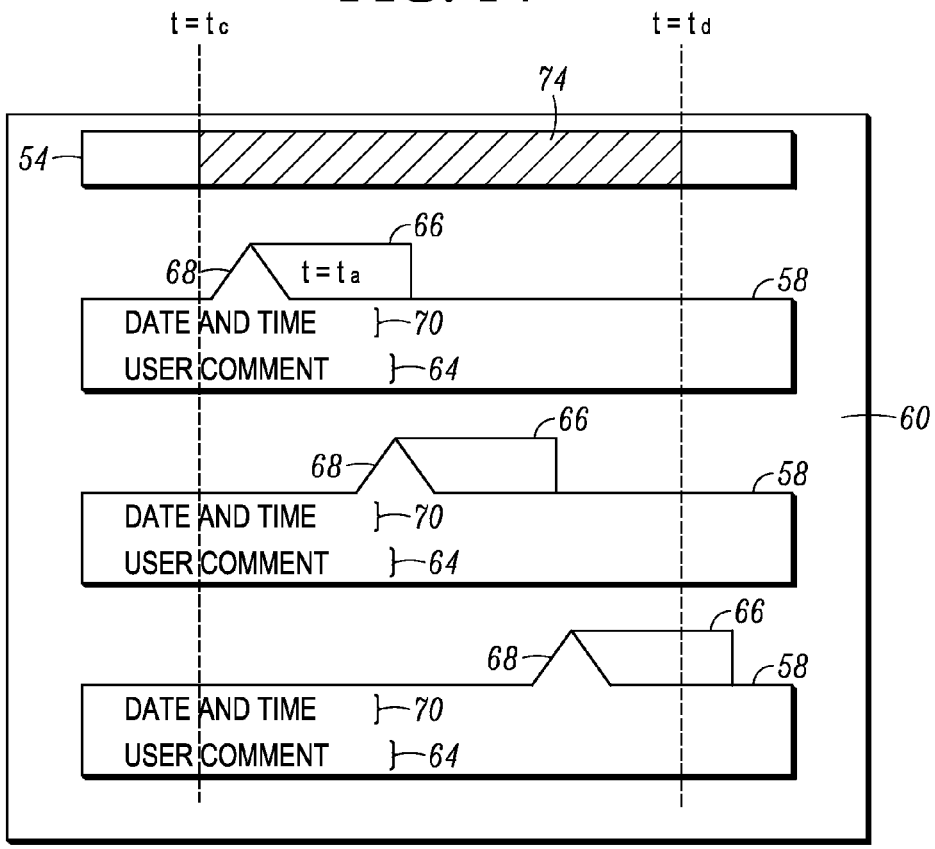
FIG. 15 is a further schematic illustration (not to scale) of the second user interface.

FIG. 15 is a further schematic illustration (not to scale) of the second UI 60. In FIG. 15, the shaded part 74 of the progress bar 54 relates to the specified part (as specified at steps s64 and s66). Also in FIG. 15, the second UI 60 comprises a plurality of comment boxes 58, each of which has a respective first timestamp 66 within the specified part 74.

Thus, a relatively simple process by which the user 24 can display comments (or a summary of the comments) relating to a specified part 74 of the TV program 2 is provided. This advantageously provides a method that may be used to generate a summary of the part 74 of the TV program 2. For example, the user 24 may just read the comments (or the summary of the comments) relating to the specified portion

74 and gain an understanding of the events that occur in that portion 74, without the user 24 having to watch (or consume) it.

Additional criteria that specify which comments or comment boxes 58 (e.g., that relate to the portion 74) should be displayed to the user 24, or how a summary of the comments that relate to the portion 74 is generated, may also be specified (e.g., by the user 24). For example, the user 24 may specify that he only wishes to have displayed to him, or summarized to him, comments or comment boxes 58 that relate to the portion 74 and that have been made by members of a certain group of other users. Also, for example, the user 24 may specify that he only wishes to have displayed to him, or summarized to him, comments that have been "liked" by other users.

Thus, a user may use a pinching or squeezing action on a timeline to define a time interval. The system then summarizes or filters posts and comments corresponding to that interval. For example, the system may display a summary of all "liked" posts and comments that relate to a point in that time interval. Also for example, a selection of video clips associated with the posts and comments may be generated and compiled into a video summary of the interval.

The selected interval may be stretched or shrunk (e.g., using a pinching motion), thereby changing the content that is displayed to the user 24. In this way, video editing may be performed, i.e., a video summary of the selected interval may be generated and changed by changing the interval. This video summarization of the selected interval may be a video summary of comments relating to the interval, i.e., the video summarization may be driven by secondary content.

The information provided to the user 24 (i.e., the comments, summary of the comments, or summary of the video content) changes as the user 24 changes the selected interval of the media presentation. This information may be presented to the user 24 in any appropriate way. For example, comments may ordered according to a rating given to those comments by other users. Also for example, a summary of posts and comment may be presented to the user 24, e.g., as a text summary of postings and comments. Also for example, the harvesting or compiling of video clips from the media presentation to create a video summary of the interval may use user posts and comments to determine what visual material to include in the video summary.

Figure 16:
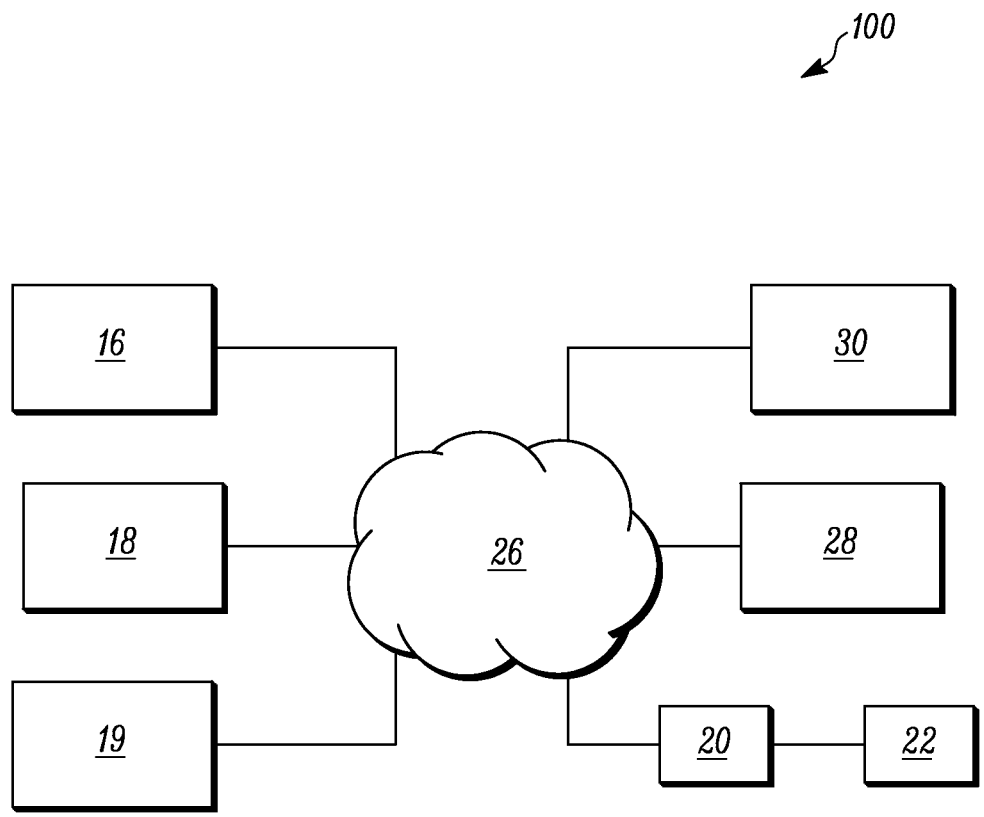
FIG. 16 is a schematic illustration (not to scale) of a further example network.

In the above embodiments, the above described methods are implemented in the example network 14 described above with reference to FIG. 2. However, in other embodiments, the methods may be implemented in a different network that may be configured in a different way. For example, in a further example network 100, the modules of the example network 14 are configured to communicate with each other via the Internet 26. FIG. 16 is a schematic illustration (not to scale) of the further example network 100 in which the above described methods may be implemented.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method of displaying a plurality of presentation elements, the method comprising:
    displaying, on a user interface, a progress bar, a length of the progress bar being representative of a duration of a multimedia presentation, a point along the length of the progress bar corresponding to a point within the multimedia presentation;
    displaying, on the user interface, at least one communication box, each communication box comprising at least one marker and a communication composed by a user in relation to a point or range within the multimedia presentation;
    receiving, via the user interface, a user input for defining a time interval by a pinching or squeezing action at a first marker corresponding to a start time and a second marker corresponding to an end time; and
    generating a video summary of the defined time interval of the multimedia presentation using one or more communications comprised in the set of communication boxes that comprise a marker within the defined time interval;
    wherein generating the video summary comprises harvesting video clips from the multimedia presentation using the one or more communications;
    wherein the progress bar and each communication box are displayed such that each marker is in alignment with a corresponding particular point or range along the length of the progress bar; and
    wherein the corresponding particular point or range along the length of the progress bar corresponds to the point or range within the multimedia presentation in relation to which the communication was composed.

2. A method according to claim 1 wherein, when the progress bar and the at least one communication box are displayed on the user interface, each marker is moveable with respect to the progress bar, by a user performing an action, such that each marker may be aligned with a different point or range along the length of the progress bar.

3. A method according to claim 1:
    wherein when the progress bar and the communication box are displayed on the user interface, the communication box may be modified, by a user performing an action, to comprise a further marker; and
    wherein the further marker is moveable with respect to the progress bar, by the user performing a further action, such that the further marker may be aligned with a different point or range along the length of the progress bar to the particular point or range along the length of the progress bar.

4. A method according to claim 1 wherein the communication box further comprises a date and time that the communication was composed by the originator.

5. A method according to claim 1 wherein the user interface is displayed on a touch-screen display of an end-user device.

6. A method according to claim 1, the method being performed by an end-user device, the method further comprising:
    receiving the communication; and
    receiving the timestamp.

7. A method according to claim 1:
    wherein the communication comprises one or more content items;
    wherein each content item is selected from a group of content items consisting of: media items, multimedia items, references to media items, and references to multimedia items; and
    wherein each content item has been selected depending on at least part of the communication and content information relating to content of the multimedia presentation.

8. A method according to claim 1 further comprising:
displaying, on the progress bar, a first point along the length of the progress bar, the first point being distinct from an end of the progress bar;
displaying, on the progress bar, a second point along the length of the progress bar; and
displaying, on a user interface, one or more communications;
wherein the first point and the second point are different points;
wherein each communication has been composed in relation to a respective point or range within the multimedia presentation; and
wherein the points or ranges within the multimedia presentation that the communications have been composed in relation to are between points in the multimedia presentation that correspond to the first point and the second point.

9. A user interface apparatus comprising:
a processor operatively coupled to a display device, the processor configured to send information to the display device for causing the display device to display a user interface comprising:
  a progress bar, a length of the progress bar being representative of a duration of a multimedia presentation, a point along the length of the progress bar corresponding to a point within the multimedia presentation; and
  a communication box, the communication box comprising a marker and a communication composed by a user in relation to a point or range within the multimedia presentation;
wherein the progress bar and the communication box are displayed on the user interface such that the marker of the communication box is in alignment with a particular point or range along the length of the progress bar; and
wherein the particular point or range along the length of the progress bar corresponds to the point or range within the multimedia presentation in relation to which the communication was composed;
the processor further configured for:
  receiving, via the user interface, a user input for defining a time interval by a pinching or squeezing action at a first marker corresponding to a start time and a second marker corresponding to an end time; and
  generating a video summary of the defined time interval of the multimedia presentation one or more communications comprised in the set of communication boxes that comprise a marker within the defined time interval;
wherein generating the video summary comprises harvesting video clips from the multimedia presentation using the one or more communications.

10. A user interface apparatus according to claim 9 wherein the marker is moveable with respect to the progress bar, by a user performing an action, such that the marker may be aligned with a different point or range along the length of the progress bar.

11. A user interface apparatus according to claim 9:
wherein the communication box may be modified, by a user performing an action, to comprise a further marker; and
wherein the further marker is moveable with respect to the progress bar, by the user performing a further action, such that the further marker may be aligned with a different point or range along the length of the progress bar to the particular point or range along the length of the progress bar.

12. A user interface apparatus according to claim 9 wherein the communication box further comprises a date and time that the communication was composed by the originator.

13. A user interface apparatus according to claim 9 wherein the user interface is displayed on a touch-screen display of the display device.

14. A user interface apparatus according to claim 9:
wherein the communication comprises one or more content items;
wherein each content item is selected from a group of content items consisting of: media items, multimedia items, references to media items, and references to multimedia items; and
wherein each content item has been selected depending on at least part of the communication and content information relating to content of the multimedia presentation.

* * * * *